United States Patent
Lee et al.

(10) Patent No.: US 9,793,845 B2
(45) Date of Patent: Oct. 17, 2017

(54) METHOD FOR RESTARTING INDUCTION MACHINE

(71) Applicants: LSIS CO., LTD., Gyeonggi-do (KR); RESEARCH COOPERATION FOUNDATION OF YEUNGNAM UNIVERSITY, Gyeongsangbuk-do (KR)

(72) Inventors: Hak-Jun Lee, Gyeonggi-do (KR); Anno Yoo, Gyeonggi-do (KR); Se-Hwan Kim, Gyeonggi-do (KR); Jul-Ki Seok, Gyeonggi-do (KR)

(73) Assignees: LSIS CO., LTD., Gyeongsan-Si (KR); RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 0 days.

(21) Appl. No.: 15/260,034

(22) Filed: Sep. 8, 2016

(65) Prior Publication Data

US 2017/0070173 A1 Mar. 9, 2017

(30) Foreign Application Priority Data

Sep. 9, 2015 (KR) .................. 10-2015-0127583

(51) Int. Cl.
*H02P 1/16* (2006.01)
*H02P 1/26* (2006.01)
(Continued)

(52) U.S. Cl.
CPC .............. *H02P 21/34* (2016.02); *H02P 1/029* (2013.01); *H02P 27/08* (2013.01); *H02P 2207/01* (2013.01)

(58) Field of Classification Search
CPC ................. H02P 21/34; H02P 27/08
(Continued)

(56) References Cited

U.S. PATENT DOCUMENTS

| 4,409,533 A | * | 10/1983 | Kawabata | ............... H02P 1/30 |
| | | | | 307/87 |
| 4,451,112 A | * | 5/1984 | Hattori | ..................... H02P 1/30 |
| | | | | 318/778 |

(Continued)

FOREIGN PATENT DOCUMENTS

| JP | 2001231276 A | 8/2001 |
| JP | 2001231292 A | 8/2001 |

(Continued)

OTHER PUBLICATIONS

Seok, Jul-Ki; Kim, Sehwan; Hexagon Voltage Manipulating Control (HVMC) for AC Motor Drives Operating at Voltage Limits; Published in: Energy Conversion Congress and Exposition (ECCE), 2014 IEEE; pp. 1707-1714; DOI: 10.1109/ECCE.2014.6953624; Publisher: IEEE Conference Publications.

(Continued)

*Primary Examiner* — Erick Glass
(74) *Attorney, Agent, or Firm* — Nath, Goldberg & Meyer; Jerald L. Meyer

(57) ABSTRACT

Disclosed embodiments relate to apparatuses, methods, and systems for restarting an induction machine. In some embodiments, a method includes estimating a position of a rotor and a speed thereof in a position and speed estimation Operation, resetting a speed reference to correspond to the speed of the rotor in a speed reference resetting Operation, generating a control voltage corresponding to the speed reference to regulate a voltage magnitude using the control voltage in a voltage magnitude regulation Operation, and re-accelerating the induction machine up to a target speed after the regulation of the voltage magnitude in a re-acceleration Operation.

7 Claims, 4 Drawing Sheets

(51) Int. Cl.
*H02P 23/00* (2016.01)
*H02P 25/00* (2006.01)
*H02P 21/34* (2016.01)
*H02P 27/08* (2006.01)
*H02P 1/02* (2006.01)

(58) Field of Classification Search
USPC .......................................................... 318/778
See application file for complete search history.

(56) References Cited

U.S. PATENT DOCUMENTS

| | | | | |
|---|---|---|---|---|
| 5,347,443 | A | * 9/1994 | Muramatsu | H02M 5/458 318/778 |
| 6,815,924 | B1 | * 11/2004 | Iura | H02P 21/34 318/727 |
| 6,900,614 | B2 | * 5/2005 | Na | H02P 27/06 318/772 |
| 7,710,053 | B2 | * 5/2010 | Tan | H02P 1/029 318/277 |

FOREIGN PATENT DOCUMENTS

| | | |
|---|---|---|
| JP | 2002369597 A | 12/2002 |
| JP | 2003284381 A | 10/2003 |
| JP | 3471204 B2 | 12/2003 |
| KR | 10-1989-0011176 A | 8/1989 |
| KR | 10-2012-0129321 A | 11/2012 |

OTHER PUBLICATIONS

LSIS R&D Center; Restarting strategy of medium-voltage inverter with voltage sensor (Abstract); Source: Power Electronics Annual Conference, Nov. 2014; pp. 81-82 (2 pages); Publisher: The Korean Institute of Power Electronics; URL: http://www.dbpia.co.kr/Article/NODE02506968.

* cited by examiner

METHOD FOR RESTARTING INDUCTION MACHINE

CROSS REFERENCE TO RELATED APPLICATIONS

This application claims the benefit of Korean Patent Application No. 10-2015-0127583, filed on Sep. 9, 2015, entitled "METHOD FOR RESTARTING INDUCTION MACHINE", which is hereby incorporated by reference in its entirety.

BACKGROUND

Technical Field

The present disclosure relates to a method and apparatus for restarting an induction machine, and more particularly, to restarting an induction machine so as to immediately resume an operation of the induction machine with no stop thereof when an instantaneous power failure and the like occur at a 3-phase alternating current power supply of an inverter and then power is restored.

Description of the Related Art

An induction machine is applicable to a variety of range from a fan or a pump to a heating ventilation air conditioning (HVAC) facility. Specifically, an induction machine driving system using an inverter has an advantage of improving energy efficiency so that it is increasingly used.

Generally, when power failure occurs in an alternating current input power supply, an inverter blocks a pulse width modulation (PWM) output within a predetermined time. However, when the power failure is instantaneous or when it takes long time to accelerate a load, it may cause a mass loss in industrial fields to entirely stop and then restart the machine. Therefore, what is required is a method for simply restarting the machine when power is restored while an induction machine is in a free run state.

During power failure, an induction machine turns a free run, and a speed and flux of a rotor are decreased over time. If a voltage for a control is input with no consideration of a varied position and speed information when a machine is restarted, there may be possibility in a generation of a large inrush current or a regenerative power at a capacitor of a direct current stage. That is, when a power voltage of a direct current stage is rising, this may be a fault cause of an inverter so that there is a need for a method for restarting an induction machine without an abrupt rising of a phase current of the induction machine and a power voltage of a direct current stage thereof.

In addition, for this purpose, so as to secure a stable restarting performance of a machine, there is a need for a method for measuring, calculating, or estimating position information of a rotor and speed information thereof when the machine is restarted.

In some embodiments of the present disclosure, since there may be a case in which attaching a rotor position sensor is difficult in some applications of an induction machine, a technology of applying an estimator for obtaining position and speed information of a rotor will be proposed. In addition, a new technology having a configuration capable of preventing a generation of an inrush current and a regenerative voltage when the induction machine is restarted will be proposed.

SUMMARY

To address the problems described above, an object of some embodiments of the present disclosure is to provide a method and apparatus for restarting an induction machine so as to immediately resume an operation of the induction machine with no stopping thereof when an instantaneous power failure occurs at a 3-phase alternating current power supply of an inverter and then power is restored.

The object of the present disclosure is not limited to the described above, and other objects and features thereof will be appreciated by the following description and will be more apparently understood by embodiments of the present disclosure. Also, it will be easily understood that the objects and features of the present disclosure can be implemented by means disclosed in the appended claims and a combination thereof.

To attain the above object, some embodiments of the present disclosure provides a method for restarting an induction machine in a process of restoring power including estimating a position of a rotor and a speed thereof when a driving signal is supplied to an induction machine, resetting a speed reference to correspond to the estimated speed of the rotor, generating a control voltage corresponding to the reset speed reference to regulate a voltage magnitude using the control voltage, and re-accelerating the induction machine up to a target speed after the voltage magnitude has been regulated.

Here, some embodiments of the present disclosure may further include blocking a driving signal being supplied to the induction machine when the estimated speed of the rotor is determined to be less than a reference speed.

At this point, the voltage magnitude regulating may be preferable to be configured to gradually regulate the voltage magnitude from a magnitude of an estimated counter electromotive force of the rotor to a magnitude of the voltage reference using an estimated value of a counter electromotive force of the rotor and the voltage reference generated to correspond to the control voltage.

In this case, the voltage reference may be generated by a model-based voltage control (MVC) or a hexagon voltage manipulating control (HVMC).

Meanwhile, the position and speed estimating may be configured to estimate the speed, a synchronous angle, and the position of the rotor from the estimated value of the rotor counter electromotive force.

Also, the estimated value of the rotor counter electromotive force may be preferable to be estimated using a stator current, a stator voltage reference, and a parameter of the induction machine.

As described above, in accordance with some embodiments of the present disclosure, when an instantaneous power failure occurs at a 3-phase alternating current power supply of an inverter and then power is restored, an operation of an induction machine may be restarted with no stopping thereof so that there may provide effectiveness capable of preventing a cost loss due to power failure in industrial fields.

Also, in the process of restarting an induction machine, functions such as a speed estimation, a voltage regulation and the like are implemented so as to prevent a generation of an inrush current and a regenerative voltage, so that there may provide an additional advantage capable of preventing damages to an inverter element and a capacitor of a direct current stage.

DETAILED DESCRIPTION

Figure 1:
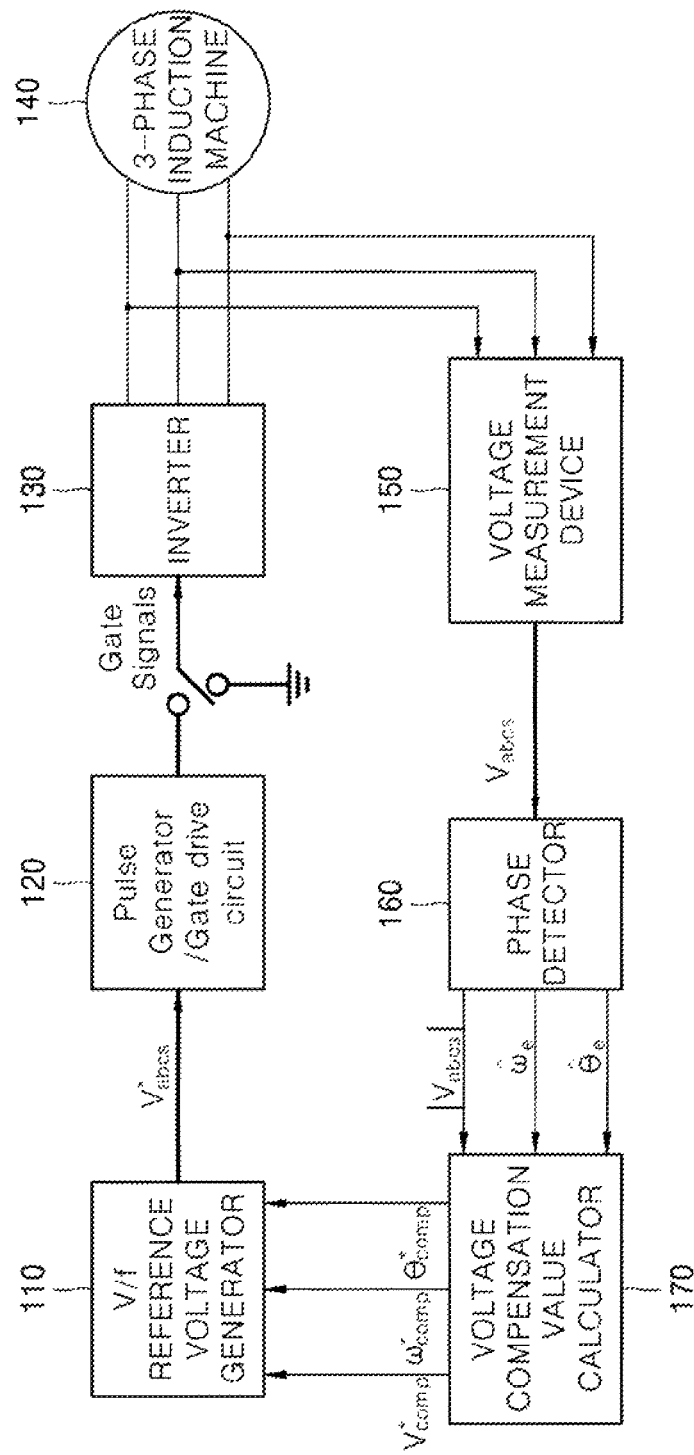
FIG. 1 is a conceptual diagram for describing a method for restarting an induction machine according to the prior art.

Advantages, features, and advantages described above of the present disclosure will be described in detail with reference to the accompanying drawings, and, therefore, the technical concept thereof can be easily implemented by those skilled in the art. Also, in the following description of the present disclosure, if a detailed description of known functions and configurations is determined to obscure the interpretation of embodiments of the present disclosure, the detailed description thereof will be omitted.

Hereinafter, embodiments according to the present disclosure will be described in detail with reference to the accompanying drawings. In giving reference numerals to components of the drawings, the same reference numerals are given to the same or similar components.

FIG. 1 is a conceptual diagram for describing a method for restarting an induction machine according to the related art.

With reference to FIG. 1, in order to restart a 3-phase induction machine 140 according to the related art, it can be verified that a V/f reference voltage generator 110, a pulse generator 120, an inverter 130, a voltage measurement device 150, a phase detector 160, a voltage compensation value calculator 170 and the like are provided.

The V/f reference voltage generator 110 generates a V/f reference voltage.

The pulse generator 120 converts the reference voltage generated at the V/f reference voltage generator 110 into a gate signal to transfer a switching signal to the inverter 130 through a gate drive circuit.

The inverter 130 is a voltage type inverter and serves to apply a voltage to the 3-phase induction machine 140.

The voltage measurement device 150 serves to measure a winding voltage between the 3-phase induction machine 140 and the inverter 130.

The phase detector 160 serves to estimate a magnitude, a frequency, and a phase of the measured voltage.

The voltage compensation value calculator 170 calculates a corrected voltage reference and speed, frequency reference and the like to generate a voltage compensation value with respect to the V/f reference voltage generator 110.

That is, when power failure occurs, an output of the gate signal from the pulse generator 120 is blocked and the 3-phase induction machine 140 freely runs by inertia.

While the 3-phase induction machine 140 freely runs, a voltage at an input terminal of a machine, which is measured through the voltage measurement device 150, is a residual voltage of the 3-phase induction machine 140 and a frequency of the residual voltage is the same as a speed of a rotor.

Therefore, a magnitude, frequency, and phase of the residual voltage are estimated through the phase detector 160. And then, using the estimated magnitude, frequency, and phase of the residual voltage, a corrected voltage reference is calculated at a restarting time of the 3-phase induction machine 140 so that it is used in a restarting operation.

After the restarting, a magnitude of a voltage is increased so as to correspond to the voltage reference, which was previously used, of the V/f voltage reference generator 110 and it is switched to a previous V/f operation to return to a normal operation state.

For reference, it is noted that the method for restarting the induction machine according to the related art as described above refers to "Restarting strategy of medium-voltage inverter with voltage sensor," Choi Seung Cheol, Hong Chan Uk, Yoo An Noh, the Korean Institute of Power Electronics, 2014 Annual Fall Conference of Power Electronics' 2014, November 2014, p. 81~82.

As described above, although the method for restarting the induction machine according to the related art includes an advantage in that an implementation is simplified due to a characteristic of a V/f control, since a position and a speed of the rotor are not exactly detected, there is a problem in that a restarting is not effectively made. Also, since an instantaneous response characteristic is low, there is a problem in that a large inrush current may be instantaneously generated. In addition, since a voltage sensor is used, there is an additional problem in that a configuration cost for an entire system is increased.

Figure 2:
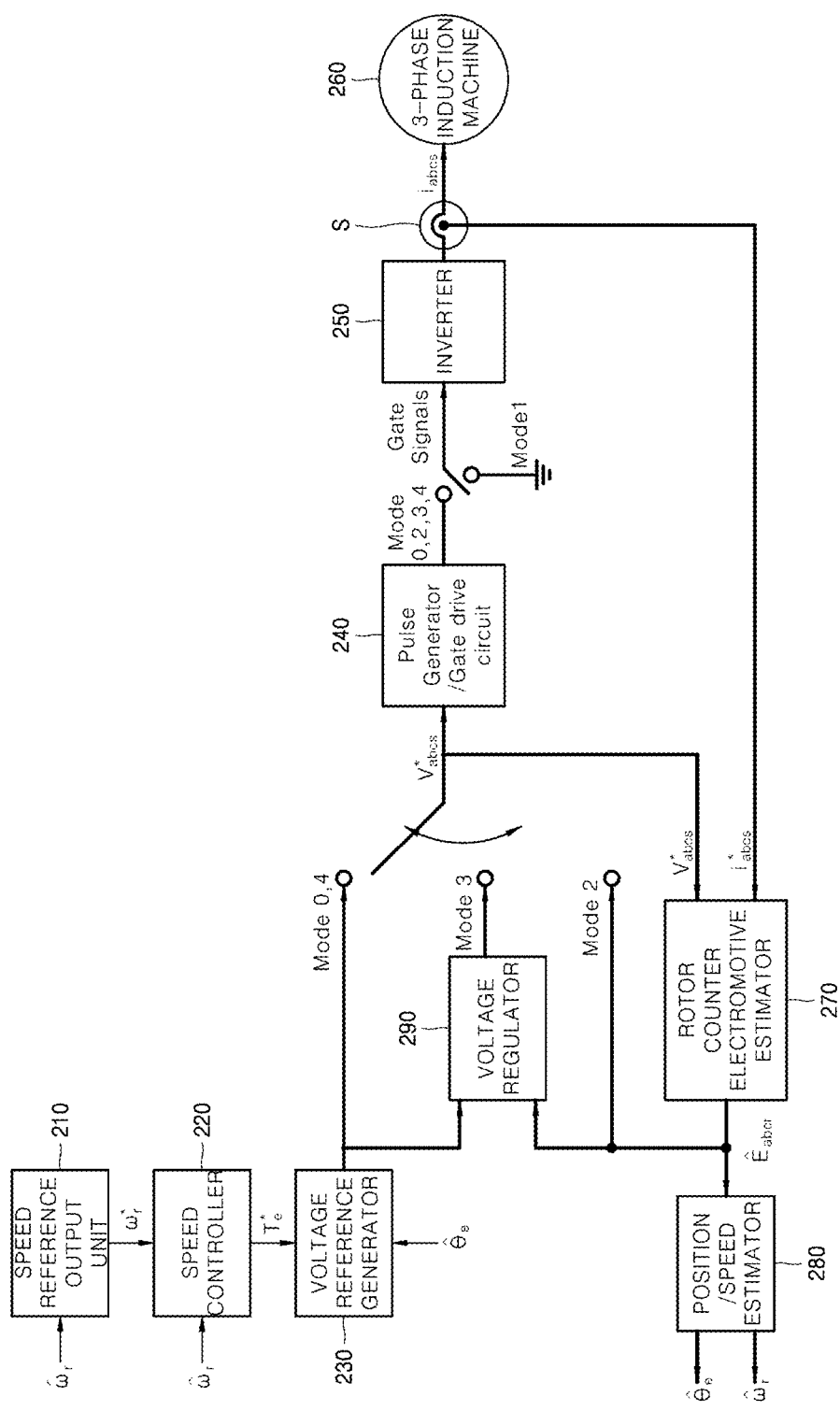
FIG. 2 is a conceptual diagram for describing a method for restarting an induction machine according to some embodiments of the present disclosure.

FIG. 2 is a conceptual diagram for describing a method for restarting an induction machine according to some embodiments of the present disclosure.

With reference to FIG. 2, in order to implement a method for restarting a 3-phase induction machine 260 according to some embodiments of the present disclosure, it can be verified that a speed reference output unit 210, a speed controller 220, a voltage reference generator 230, a pulse generator 240, an inverter 250, a rotor counter electromotive force estimator 270, a position/speed estimator 280, a voltage regulator 290 and the like.

The speed reference output unit 210 outputs a speed reference.

The speed controller 220 may be implemented by a controller in a typical proportion-integration form and serves to control a speed through an output of a torque reference.

The voltage reference generator 230 serves to generate a voltage reference corresponding to the torque reference being received, and it may be preferable to be configured to use a voltage model based open-loop vector control of the 3-phase induction machine 260.

The pulse generator 240 serves to convert a voltage reference into a gate signal to transmit a switching signal to the inverter 250 through a gate drive circuit.

The inverter 250 may be configured with a voltage type inverter and servers to apply a voltage to the 3-phase induction machine 260.

The rotor counter electromotive force estimator 270 serves to estimate a counter electromotive force of a rotor based on the voltage reference and a measured current.

The position/speed estimator 280 serves to estimate position and speed information of a rotor using a counter electromotive force thereof which is estimated through the rotor counter electromotive force estimator 270.

The voltage regulator 290 serves to gradually vary a magnitude of a voltage so as to enable a smooth switching between a speed estimation mode (Mode 2) and a re-acceleration mode (Mode 4).

In addition, it can be verified that a phase current measurement sensor S and the like are provided necessary for implementing sensorless position control and the like.

That is, the method for restarting an induction machine according to some embodiments of the present disclosure proceeds in an order of a speed estimation, a voltage regulation, and a re-acceleration after power is restored.

Here, in FIG. 2, Mode 0 means a normal operation state, Mode 1 means a power failure state, Mode 2 means a speed estimation, Mode 3 means a voltage regulation, and Mode 4 means a re-acceleration. In a power failure state corresponding to Mode 1 among them, a pulse width modulation (PWM) signal is blocked to stop a switching operation of an inverter.

For following a speed reference of the 3-phase induction machine 260, which is input from the speed reference unit 210, a speed controller 220 being configured with a proportional-integral controller and the like may be used. Here, a torque reference output from the proportional-integral controller 220 is used as an input of the voltage reference generator 230.

A voltage reference generation method by the voltage reference generator 230 may be classified into two methods of a model-based voltage control (hereinafter, referred to as an MVC) and a hexagon voltage manipulating control (hereinafter, referred to as an HVMC) according to whether or not a voltage is limited. That is, when a voltage is not limited, a voltage reference is output using the MVC, and otherwise, when the voltage is limited, the voltage reference is output using the HVMC. Each method described above will be described below using Equations.

Firstly, the MVC is a method in which a voltage reference is obtained from a flux equation corresponding to rated flux and a torque equation in a positive torque region, and the voltage reference satisfies maximum torque per unit current. For obtaining a voltage reference in a positive region, torque and a flux equation of an induction machine in a rotor flux reference control is used.

The torque and the flux equation may be represented by a torque reference and a flux reference as in Equation 1 and Equation 2 as follows.

$$T_e^* = \frac{3}{2}\frac{P}{2}\frac{L_m}{L_r}\lambda_{dr}^{e*} i_{qs}^{e*}$$ [Equation 1]

$$\lambda_{dr}^{e*} = \frac{L_m}{1+\tau_r p} i_{ds}^{e*} \cong L_m i_{ds}^{e*}$$ [Equation 2]

Here, $T_e^*$ represents a torque reference output from the speed controller 220, $\lambda_{dr}^{e*}$ represents a flux reference of an induction machine $i_{ds}^{e*}$ and $i_{qs}^{e*}$ represent a d-axis current reference and a q-axis current reference in a synchronous reference frame, respectively.

Also, $L_m$ and $L_r$ mean a magnetizing inductance and a rotor synchronous inductance of the induction machine, respectively, $\tau_r$ means a rotor time constant, $\rho$ means a differential operator. Meanwhile, a voltage equation of the induction machine is simplified in a form of a counter electromotive force term to be represented as the following Equations.

$$v_{ds}^{e*} \cong -\omega_e \sigma L_s i_{qs}^{e*}$$ [Equation 3]

$$v_{qs}^{e*} \cong \omega_e L_s i_{ds}^{e*}$$ [Equation 4]

Here, $v_{ds}^{e*}$ and $v_{qs}^{e*}$ mean a d-axis voltage reference and a q-axis voltage reference in the synchronous reference frame, respectively, and $\omega_e$ means a synchronous angular velocity of the induction machine. Also, $L_s$ and $\sigma L_s$ means a stator inductance and an excess inductance of the induction machine.

And, if Equation 1 to Equation 4 are written in a simultaneous equation form, a voltage reference in the synchronous reference frame may be calculated from the torque and the flux reference as follows.

$$v_{ds}^{e*} = -\frac{T_e^* \omega_e \sigma L_s}{\frac{3}{2}\frac{P}{2}\frac{L_m}{L_r}\lambda_{dr}^{e*}}$$ [Equation 5]

$$v_{qs}^{e*} = \frac{\lambda_{dr}^{e*}}{L_m}\omega_e L_s$$

On the other hand, the HVMC is a method for obtaining a voltage reference from a voltage limitation hexagon and a torque equation so as to maximize a voltage usage in a field weakening region at which a magnitude of a voltage is limited.

The torque equation of the induction machine may be expressed using a voltage reference as the following equation.

$$T_e^* = \frac{3}{2}\frac{P}{2}\frac{L_m^2}{L_r}\cdot\left(-\frac{v_{ds}^{e*}}{\omega_e \sigma L_s}\right)\cdot\left(\frac{v_{qs}^{e*}}{\omega_e L_s}\right)$$ [Equation 6]

In a case of a voltage limitation, the torque reference may be represented as a hexagonal form rotating on the synchronous reference frame, and each of six sides of the voltage limitation hexagon may be represented by a linear equation as follows.

$$v_{qs}^{e*} = M_n v_{ds}^{e*} + B_n \ (n=1,2,\ldots,6)$$ [Equation 7]

Here, $M_n$ and $B_n$ mean a slope and an intercept of each of the six sides of the rotating hexagon, respectively, and are a constant value which is varied as a synchronous angle is rotated. And, if Equation 6 and Equation 7 are written in a simultaneous equation form, a solution of the voltage reference may be obtained as follows.

$$\therefore \begin{cases} v_{ds}^{e*} = \frac{-b \pm \sqrt{b^2 - 4ac}}{2a} \\ v_{qs}^{e*} = M_n v_{ds}^{e*} + B_n \end{cases}$$ [Equation 8]

Here, $a = M_n$, $b = B_n$, $$c = \frac{T_e^*}{\frac{3}{2}\frac{P}{2}\frac{L_m^2}{L_r}\frac{1}{\omega_e \sigma L_s}\frac{1}{\omega_e L_s}}$$ are satisfied.

That is, the HVMC means an intersection point between a torque curve of the induction machine and a voltage limit hexagon.

$v_{ds}^{e*}$ and $v_{qs}^{e*}$, that is, the d-axis voltage reference and the q-axis voltage reference on the synchronous reference frame are converted into a 3-phase a-b-c- reference frame using an estimated synchronous angle $\hat{\theta}_e$, which is output information of the position/speed estimator 280, thereby being output as $v^*_{abcs}$.

The rotor counter electromotive force estimator 270 estimates a rotor counter electromotive force $\hat{E}_{abcr}^s$ on the 3-phase reference frame using a stator current $i_{abcs}$ and a stator voltage reference $v^*_{abcs}$ on the 3-phase a-b-c reference frame, and a parameter of the induction machine.

The position/speed estimator 280 estimates a rotor speed, a synchronous angle, and a position of the rotor using $\hat{E}_{abcr}^s$.

As for more details of the described above, see "Seok, J.; Kim, S., "Hexagon Voltage Manipulating Control (HVMC) for AC Motor Drives Operating at Voltage Limit," Industry Applications, IEEE Transactions on XX, vol. PP, no. 99, pp. 1, 1."

Figure 3:
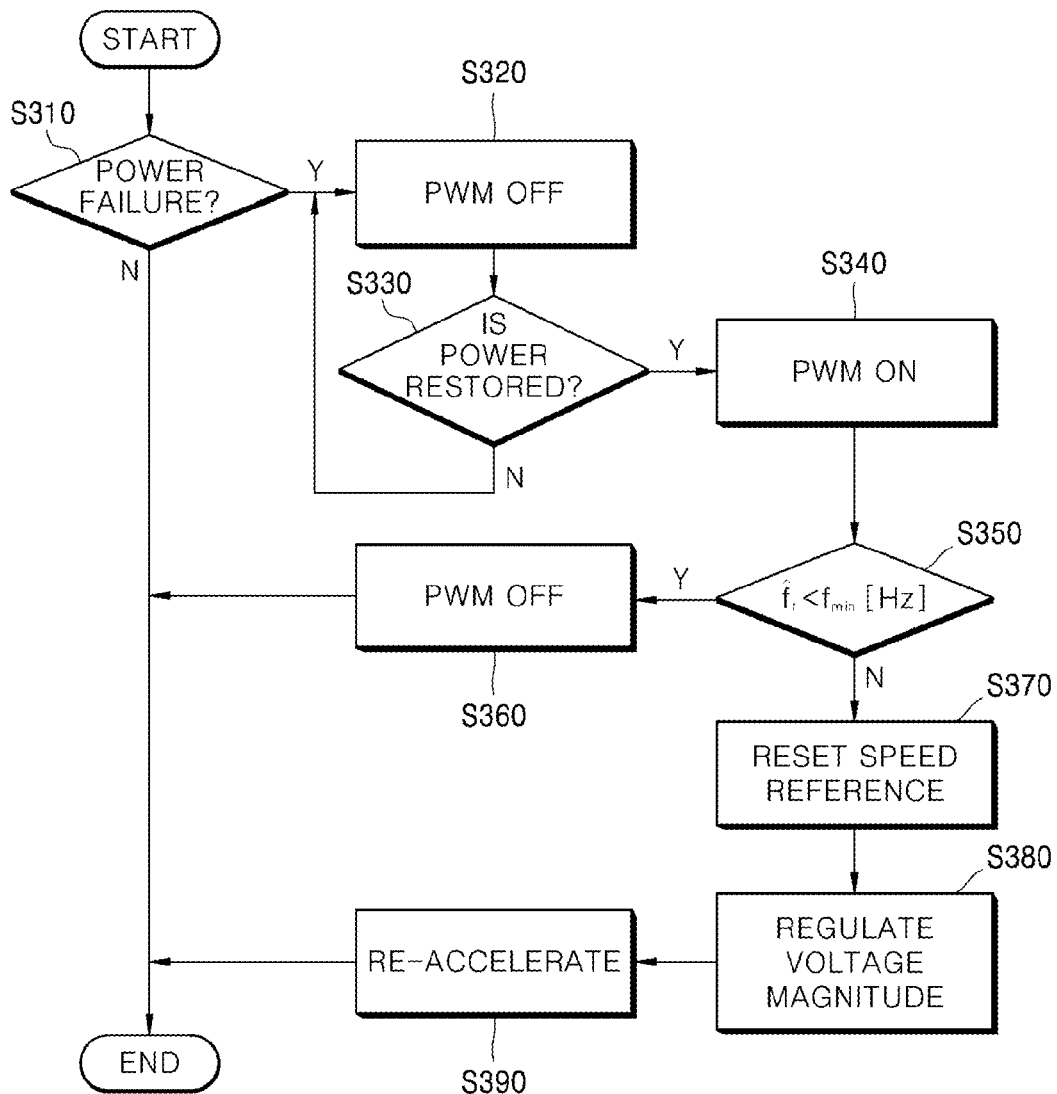
FIG. 3 is a flowchart for describing a method for restarting an induction machine according to some embodiments of the present disclosure.

FIG. 3 is a flowchart for describing a method for restarting an induction machine according to some embodiments of the present disclosure.

With reference to FIG. 3, it can be verified that the method for restarting an induction machine according to some embodiments of the present disclosure is configured to include determining whether or not power failure occurs in Operation S310, determining whether or not power is restored in Operation S330, determining a rotational speed of a machine in Operation S350, resetting a speed reference based on the rotational speed of the machine in Operation S370, regulating a magnitude of a voltage in Operation S380, and re-accelerating in Operation S390.

When power failure occurs in Operation S310, a PWM signal is firstly turned off in Operation S320. That is, with reference to FIG. 2, a switch connected to an input terminal of the inverter 250 is switched to Mode 1, and all gating signals are in an OFF state by turning off the PWM signal in Operation S320.

Thereafter, when power is restored in Operation S330, the PWM signal is again output, and rotor counter electromotive force estimator 270 and the position/speed estimator 280 estimate a position of the rotor and a speed thereof. Also, a switch connected to an input terminal of the pulse generator 240 is switched to Mode 2, and rotor information at the time when the power is restored is obtained from the rotor counter electromotive estimator 270 and the position/speed estimator 280 using a voltage reference and the measured current.

That is, a rotor counter electromotive force $\hat{E}_{abcr}^s$ of a machine turning a free-run is estimated using the rotor counter electromotive force estimator 270, and a current position $\hat{\theta}_e$ of the rotor and a current speed $\hat{\omega}_r$ thereof are estimated using the position/speed estimator 280.

While such speed estimation is performed, so as to minimize an inrush current at the stator by minimizing a potential difference between the rotor counter electromotive force and a voltage of the stator, the estimated counter electromotive force $\hat{E}_{abcr}^s$ is used as a voltage reference. A speed estimation performance is influenced according to a control bandwidth of the rotor counter electromotive force estimator 270 and the position/speed estimator 280. Meanwhile, since there may be a transient state at an initial stage of estimation, it may be preferable to maintain a speed estimation mode Mode 2 until a steady state enters.

And, in Operation S350, it is determined whether or not the estimated speed $\hat{f}_r$ is less than a minimum speed $f_{min}$ required for securing stability of a sensorless control.

If the estimated speed is less than the minimum speed as the determination result of Operation S350, the PWM signal is again turned off to stop the machine in Operation S360. That is, when the estimated speed is determined to be less than the minimum speed, the PWM signal is turned off the same as an operation performed in the power failure state described above. Consequently, the switch connected to the input terminal of the inverter 250 is switched to Mode 1 to set all gating signals to maintain an OFF state by turning off the PWM signal.

Otherwise, if the estimated speed is equal to or greater than the minimum speed as the determination result of Operation S350, the speed reference is reset to a current estimated speed in Operation S370. In other words, at the time when the speed estimation has been completed, the speed reference output unit 210 resets the speed reference to the estimated rotor speed $\hat{\omega}_r$ output from the position/speed estimator 280. Thereafter, a control voltage $v^*_{abcs}$ is generated using the reset speed reference through the speed controller 220 and the voltage reference generator 230.

As a result of such operations, the voltage reference $v^*_{abcs}$ generated from the voltage reference generator 230 and the rotor counter electromotive force estimation value $\hat{E}_{abcr}^s$ of the rotor counter electromotive estimator 270 include the same frequency. However, a rotor counter electromotive force of the rotor counter electromotive force estimator 270 is varied in a magnitude according to a flux variation of the rotor so that it includes a magnitude different from that of the voltage reference of the voltage reference generator 230.

Therefore, in the following Operation S380 regulating a voltage magnitude, the voltage magnitude is gradually varied so as to perform a smooth switching between the speed estimation mode Mode 2 and the re-acceleration mode Mode 4. At this point, the switch connected to the input terminal of the pulse generator 240 is switched to Mode 3.

In other words, a magnitude difference between the rotor counter electromotive force of the rotor counter electromotive force estimator 270 and the voltage reference of the voltage reference should be smoothly regulated. If not, when a mode switching is performed between the speed estimation mode Mode 2 and the re-acceleration mode Mode 4, there may possibility in generating an inrush current and the like due to an abrupt voltage magnitude variation. Therefore, some embodiments of the present disclosure provides a configuration using the voltage regulator 290 so as to gradually vary from a magnitude of the estimated rotor counter electromotive force of the rotor counter electromotive force estimator 270 to a magnitude of the voltage reference of the voltage reference generator 230.

A configuration and a function of the voltage regulator 290 will be described with reference to FIG. 4.

Figure 4:
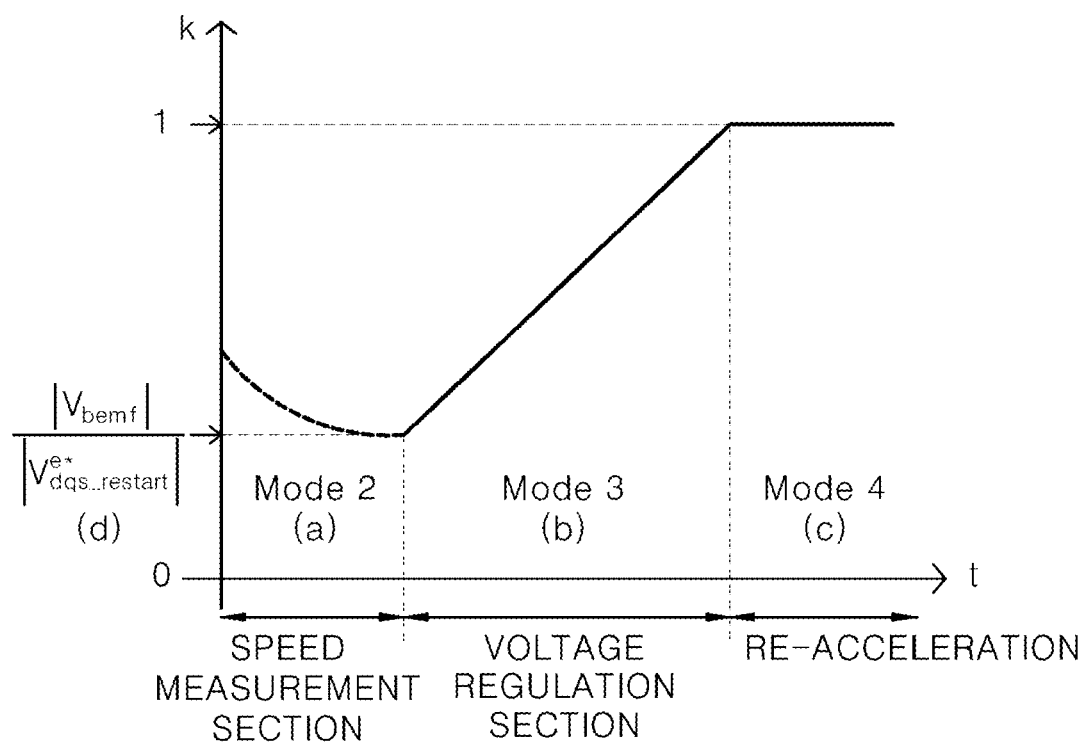
FIG. 4 is a graph for describing a voltage regulation method using a voltage regulator of FIG. 3, according to some embodiments of the present disclosure.

FIG. 4 is a graph for describing a voltage regulation method using a voltage regulator of FIG. 3.

With reference to FIG. 4, a section (a) means a speed estimation section, that is, Mode 2. In this section, a magnitude of an estimated value of a rotor counter electromotive force is calculated.

A section (b) means a voltage regulation section, that is, Mode 3. In this section, a voltage is gradually varied from the magnitude of the estimated rotor counter electromotive force to a magnitude of a voltage reference.

A section (c) means a re-acceleration section, that is, Mode 4. This section is a state in which a preparation for restarting an induction machine is completed, and thus the induction machine is re-accelerated at a speed of a normal operation.

A section (d) is a value representing a ratio of a magnitude of the rotor counter electromotive force with respect to the magnitude of the voltage reference calculated from a reset speed reference.

In other words, when a magnitude $|v_{bemf}|$ of a rotor counter electromotive force $\hat{E}_{abcr}^s$ used on the speed estimation section (a), and a magnitude $|v_{dqs\_restart}^{e*}|$ of a restarting voltage reference $v^*_{abcs}$ calculated from a reset speed reference, a ratio of a magnitude of the rotor counter electromotive force with respect to a magnitude of an initial voltage reference may be represented using $k_0$ as the following Equation 9.

$$k_0 = \frac{|v_{bemf}|}{|v_{dqs\_restart}^{e*}|}$$ [Equation 9]

A value of a proportional constant k in the voltage regulation section (b) is varied from $k_0$ to 1, and the stator voltage reference on the synchronous reference system may be transformed in a ramp form by multiplying the restarting voltage reference by the proportional constant k as the following Equation 10.

$$v_{dqs}^{e*} = k \cdot v_{dqs\_restart}^{e*}$$ [Equation 10]

That is, referring back to FIG. 3, after the voltage magnitude regulation Operation S380 is completed, in other words, the voltage regulation mode is completed, the re-acceleration Operation S390 means a process for re-accelerating a machine up to a desired target speed according to an acceleration profile.

The re-acceleration Operation S390 is in a state in which a preparation process for restarting the induction machine has been completed. Therefore, the speed reference output unit 210 varies a speed reference up to a speed reference value at a normal operation to re-accelerate the 3-phase induction machine 260 using the reset speed reference through the speed controller 220 and the voltage reference generator 230.

As described above, in accordance with the method for restarting an induction machine according to some embodiments of the present disclosure, during an instantaneous power failure occurs at a 3-phase alternating current power supply of an inverter and then power is restored, an operation of an induction machine is restarted without being stopped, so that there may provide effectiveness capable of preventing a cost loss due to power failure in industrial fields as described above.

Also, in the process of restarting an induction machine, functions such as a speed estimation, a voltage regulation and the like are implemented so as to prevent a generation of an inrush current and a regenerative voltage, so that there may provide an additional advantage capable of preventing damages to an inverter element and a capacitor at a direct current stage.

As described above, the present disclosure can be devised by those skilled in the art without departing from the technical concept and scope of this disclosure, along with the full range of substitutions, modifications, and alterations to which such claims are entitled, and the present disclosure is not limited to some embodiments disclosed herein and the accompanying drawings. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for restarting an induction machine to restore power, comprising:
   estimating a rotor counter electromotive force and estimating a position and a speed of a rotor based on the rotor counter electromotive force when a driving signal is supplied to an induction machine;
   resetting a speed reference to correspond to the estimated speed of the rotor;
   generating a control voltage corresponding to the reset speed reference;
   regulating a voltage magnitude using the control voltage and the rotor counter electromotive force; and
   re-accelerating the induction machine up to a target speed after the voltage magnitude has been regulated,
   wherein the rotor counter electromotive force is used as a voltage reference while performing the estimation of the position and the speed of the rotor.

2. The method of claim 1, wherein resetting the speed reference includes:
   determining whether the estimated speed of the rotor is equal to or greater than a reference speed; and
   resetting the speed reference to correspond to the estimated speed of the rotor when it is determined that the estimated speed of the rotor is equal to or greater than the reference speed.

3. The method of claim 2, further comprising:
   blocking a driving signal being supplied to the induction machine when the estimated speed of the rotor is determined to be less than the reference speed.

4. The method of claim 1, wherein regulating the voltage magnitude comprises gradually regulating the voltage magnitude from a magnitude of an estimated counter electromotive force of the rotor to a magnitude of the voltage reference using an estimated value of a counter electromotive force of the rotor and the voltage reference generated to correspond to the control voltage.

5. The method of claim 4, wherein the voltage reference is generated by a model-based voltage control (MVC) or a hexagon voltage manipulating control (HVMC).

6. The method of claim 1, wherein estimating the position and speed comprises estimating the speed, a synchronous angle, and the position of the rotor from an estimated value of the rotor counter electromotive force.

7. The method of claim 6, wherein the estimated value of the rotor counter electromotive force is estimated based on at least a stator current, a stator voltage reference, and a parameter of the induction machine.

* * * * *